Sept. 23, 1969     S. W. MARTIN     3,468,605
DOCUMENT FEEDING DEVICE FOR COPYING MACHINES
Filed June 30, 1967     3 Sheets-Sheet 1

INVENTOR
Samuel W. Martin
BY
ATTORNEY

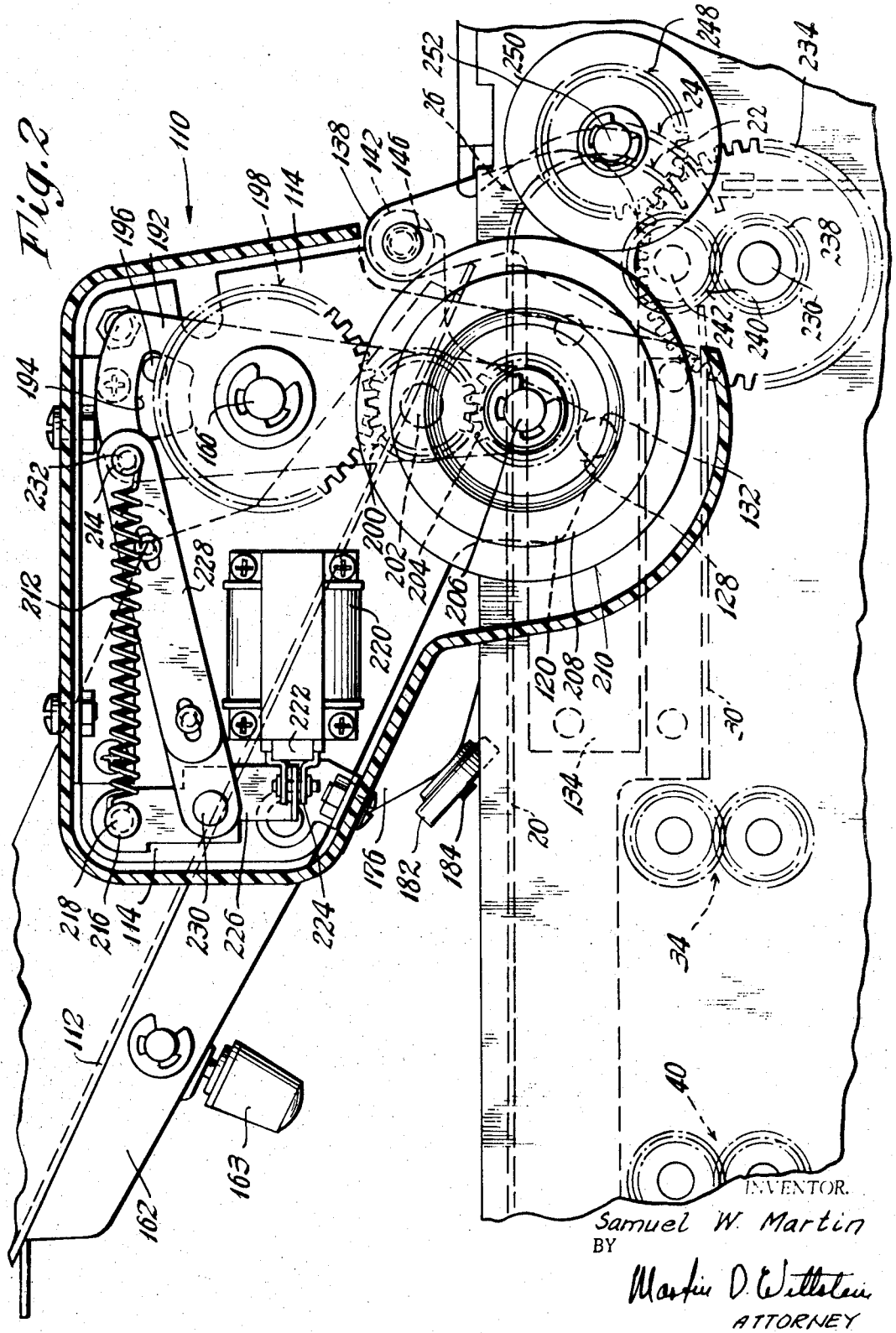

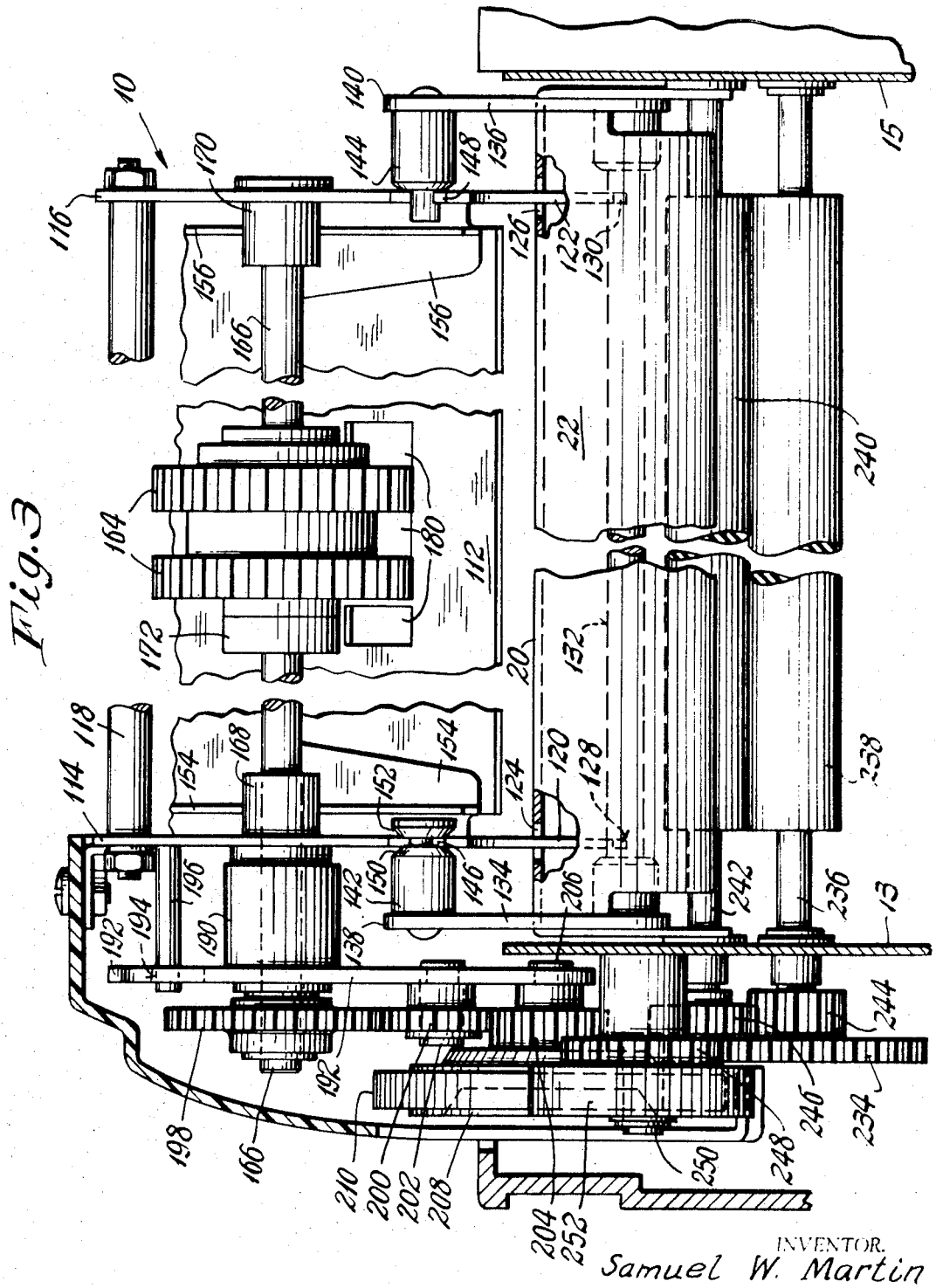

United States Patent Office 3,468,605
Patented Sept. 23, 1969

3,468,605
DOCUMENT FEEDING DEVICE FOR COPYING
MACHINES
Samuel W. Martin, Weston, Conn., assignor to Pitney-Bowes, Inc., Stamford, Conn., a corporation of Delaware
Filed June 30, 1967, Ser. No. 650,326
Int. Cl. G03b 29/00
U.S. Cl. 355—29          2 Claims

ABSTRACT OF THE DISCLOSURE

A photographic document copier having a document illumination station, an exposing station and an optical system for projecting images from the illumination station to the exposing station. Two transport mechanisms are located at both stations for transporting documents and a web of sensitized copy paper, respectively. A feeding mechanism feeds a particular length of the web of copy paper to its transport, at which time a severing device severs the web. A removable tray which is attached to the top of the copier can accommodate a stack of documents and carries document feeding rollers to successively feed the top most document to the document transport. Control switch elements are located in the path of movement of the document to sense the leading and trailing edges of the documents to actuate the severing mechanism. A normally operating driving element is carried by the main frame of the copier, and the removable tray carries an element for establishing a driving connection between the driving element and the document feeding when the tray is placed on the copier.

Cross references

This application discloses and claims subject matter disclosed in application Ser. No. 651,101, filed June 30, 1967, in the name of Charles B. Fox and Fredric E. Zucker, and assigned to the assignee of this application.

Summary of the invention

The present invention relates to a device for successively feeding original documents to a photocopy machine.

The so-called "desk-top" office copying machine has, in recent years, achieved great popularity and now enjoys a large degree of commercial success. The situation is due, at least in part, to the simple and efficient operation of the copying machine to the extent that with a majority of the types commercially available, any person, even though unskilled in copying machine operation, can push a button, insert a document into a slot, and obtain satisfactory copy while waiting only a matter of several seconds.

For the most part, these machines store their own copy paper, either in web or cut sheet form, and many have provision for measuring the length of an original document and severing a copy paper web into sheets corresponding to the length of the original document.

In most of the sucessful copying machines of the small office or desk-top variety, the emphasis in design has been on simplicity and ease of operaiton to the end that any relatively unskilled office worker can, with a minimum of orientation, operate the machine and obtain satisfactory copies. Also considerable design emphasis has been placed on keeping the copying machine relatively simple and free of automatic equipment to the end of maintaining as low a price as possible so as to make the copying machine economically attractive to a one-man office operation.

In the development of desk-top office copying machines generally along the above lines, there is an area of use of the copying machine which has been generally overlooked so far as equipment development in connection with this use is concerned. The use referred to is the copying in rapid succession of a larger number of documents, such as would occur if, for example, one wanted a copy or two of a multi-page pamphlet, booklet, typed or printed report, or any other of a multitude of examples where the original composite being copied is made up of a large number of sheets. It should be understood that the foregoing is a specific area of use of a copying machine and should not be confused with general duplicating. For example, if it were desired to make up a hundred or more copies of a single document, or even a great many copies of a multi-document composite, there is a variety of duplicating equipment commercially available and economically much more suited to this type of work than the office copying machine. The present area of consideration is more or less limited to that class of copying in which one or two, or perhaps several at the most, copies of a multi-page original composite are desired, and desired quickly.

Heretofore, in performing copying operations of this type, it was necessary for an operator to stand before the copying machine and successively feed the documents to be copied into the machine. This, of course, could be a very tedious and time-consuming job, depending upon the number of documents to be copied. Also there is the possibility of human error, due to the nature of the copies unless the operator pays close attention to the copying operation.

Accordingly, the present invention is directed toward the combination of a device which will automatically feed documents successively to an office copying machine and that part of the copying machine with the feeding device cooperates to feed documents at a controlled rate, thereby leaving the operator free to attend to other duties. The present invention contemplates within its principles a device which is portable and readily attachable to a desk-top copier without any alterations or modifications to the copier as sold and without any complicated operator manipulations or the need for any tools, and which will feed documents to the copying machine in a timed sequence which is coordinated with the rate of normal operation of the copying machine.

The document feeding device of the present invention comprises generally a hopper or tray like or having means for readily mounting the device on a copying machine which has provision for receiving the feeding device. The latter is provided with feed rollers which successively feed the top most document from a stack, and a drive mechanism for the feed rollers which is connected to a portion of the copying machine feed mechanism, on both the feeding device and the copying machine being such that a driving connection between the two is automatically established merely by properly placing the document feeding device on the copying machine.

The document feeding device carries a means for disengaging the feed rollers from the copying machine drive system at such time as it is inappropriate to feed a document to the copying machine, either because the preceding document is still passing through the copying machine or because it has jammed up in the document path therein. In any event, the feeding device is under the control of original documents in the copying machine to regulate or otherwise control the occurrence or non-occurrence of another document being fed to the copying machine.

Having briefly described the nature and construction of a preferred embodiment of the present invention, it is a principal object thereof to provide a document feeder with a desk-top office copying machine which is portable and readily attachable and detachable from the copying machine.

It is another object of the present invention to provide a document feeding device for use in combination with a desk-top office copying machine which requires no modification or alteration of the copying machine as manufactured for mounting the feeding device thereon, and which derives its power for feeding documents directly from the drive mechanism of the copying machine.

It is yet another object of the present invention to provide a document feeding device for use in combination with a desk-top office copying machine which operates in conjunction with the normal single document type of operation of the copying machine such that the latter is operable with or without the feeding device in place.

These and other objects and disadvantages of the present invention will become more apparent from an understanding of the following detailed description of a preferred embodiment of the invention when considered in conjunction with the accompanying drawings in which:

FIG. 2 is a fragmentary side elevation of the combination shown in FIG. 1, showing the details of the feeding device driving and disengaging mechanism; and FIG. 3 is a fragmentary sectional and rear elevation of the apparatus as shown in FIG. 2, showing the document feed mechanism.

Detailed description

Figure 1:
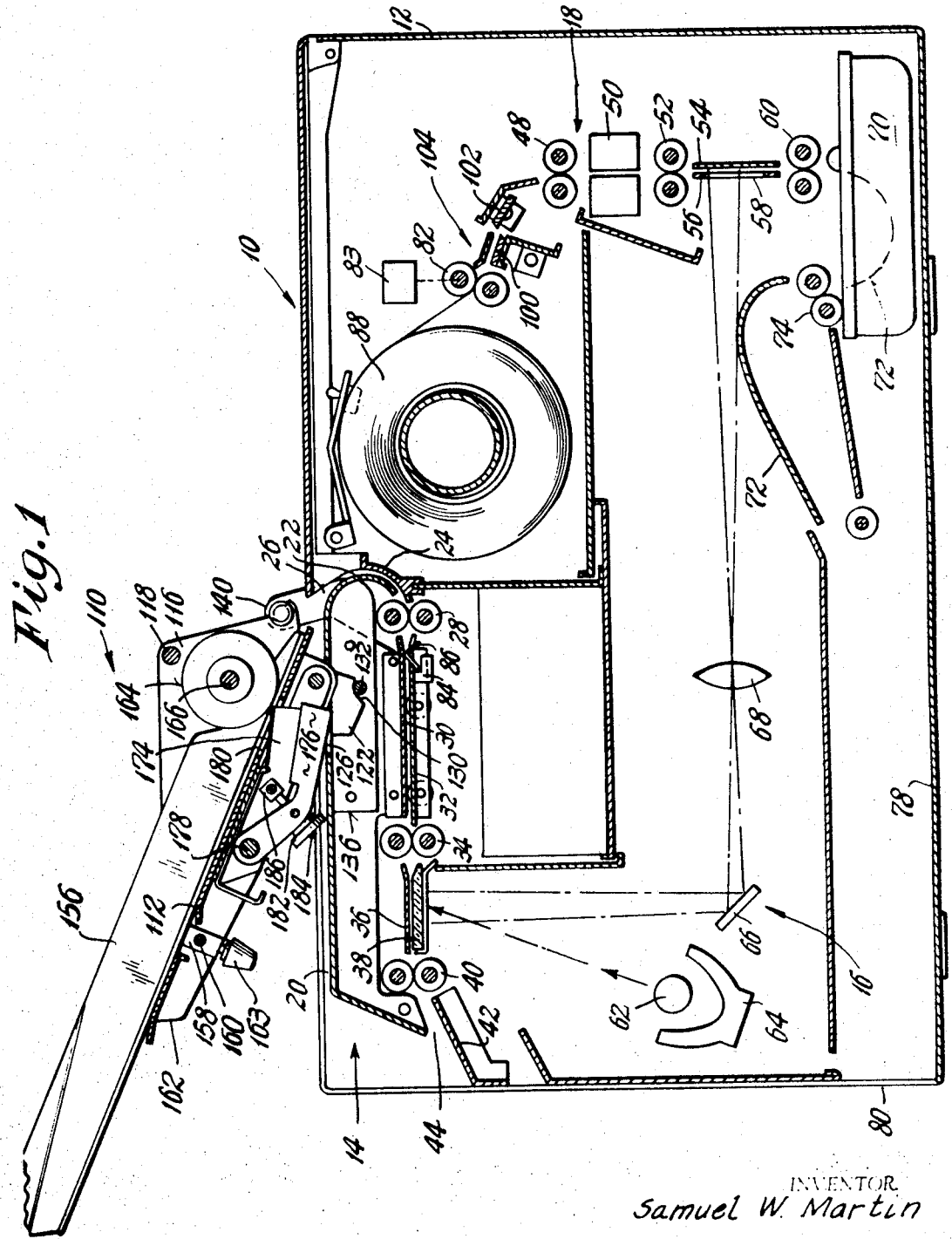
FIG. 1 is a side sectional view through a typical desk-top office copying machine with the document feeding device in place thereon.

Referring now to the drawings and particularly to FIG. 1, the present invention comprises firstly a copying machine 10 having a substantially rectangular housing 12 which consists generally of frame and panel members for supporting and enclosing the structure and components hereinafter described, side frame members 13 and 15 being specifically shown in FIG. 3. For the purpose of illustrating the principles of the invention, an electrostatic copying machine is shown in the drawings in which an original document is illuminated and an image of indicia on the document is projected to light sensitive copy paper through an image forming means, the resultant latent electrostatic image then being developed by the application of attractable particles to the paper, all in a manner well known in the art. Copy paper is stored in the copying machine in roll form and is fed and severed to length as needed. As will be more readily apparent as the description of the preferred embodiment of the invention proceeds, the principles of the invention are applicable to copying machines using other copying processes as well as to machines which utilize copy paper in cut sheet form.

A first paper transport means 14 is disposed on one portion of the housing 12 for transporting original documents along a document path and past an illuminating station which forms part of an imaging forming system 16 for projecting an image of indicia on the document to an imaging station past which copy paper is transported along a copy paper path by a second paper transport means 18, the document and the copy paper being fed past the illuminating and imaging stations respectively in synchronism by a common drive means (not shown) for the feed rollers described below which are part of the paper transport means 14 and 18.

More particularly, the paper transport means 14 comprises a horizontal guide plate 20 having a rear curved portion 22 which, with a correspondingly curved guide means 24 forms an entrance slot 26 into the document path. The latter is further defined by a pair of feed rollers 28, upper and lower guide plates 30 and 32 respectively, a second pair of feed rollers 34, a guide plate 36, a cooperating transparent supporting member 38 which defines the aforementioned illuminating station, a third pair of feed rollers 40 and a guide plate 42 defining an outlet slot 44 for the documents which may be deposited in a suitable receptacle.

The transport means 18 comprises a pair of feed rollers 48 which feed copy paper through an electrostatic charging unit 50, another pair of feed rollers 52, a pair of cooperating guide plates 54 and 56, the latter having an aperture 58 which defines the imaging station, and a third pair of feed rollers 60.

The image forming means 16, in addition to the illuminating and imaging stations, comprises an optical system having a light source 62 and reflector 64 for illuminating the document as it passes over the glass plate 38, and a mirror 66 positioned to receive light rays from the document and to reflect these rays through a focusing lens 68 to the imaging station defined by the apertured plate 56.

Since all of the roller pairs 28, 34, 40, 48, 52 and 60 thus far described are continuously driven at the same rate of speed, it will be apparent that an image of the indicia on an original document is continuously projected to copy paper passing through the imaging station as said indicia is illuminated while passing through the illuminating station, all in a manner well known in the art.

The latent electrostatic image thus formed on the copy paper is developed and made visible by passing the copy paper through a toner solution held in a suitable toner tank 70, any suitable guiding structure 72 being provided in the tank. A pair of feed rollers 74 feeds the copy paper through a suitable drying unit 76 after which the copies are deposited on a tray 78 for manual removal through an opening 80 in the housing 12.

It will be seen that in the copying machine shown in the drawings, a copy paper web is stored therein in the form of a roll, and means are provided for feeding the leading edge of the web to the transport means 18 on demand when a document is being transported along the document path. Also means are provided for severing the copy paper web into lengths corresponding to the length of the original document being copied.

To accomplish these functions, there is provided a pair of intermittently operable feed rollers 82 which is engageable for operation with the same drive system to which the other roller pairs are connected such as by means of a solenoid actuated clutch mechanism 83 or other suitable control means well know in the art and therefore not shown in detail in the drawings. Control means, preferably in the form of a switch 84 having an actuator 86 positioned in the document path, is provided to actuate the clutch mechanism 83 to thereby cause the roller pair 82 to commence feeding copy paper from the roll 88 to the transport means 18 when the leading edge of a document reaches a predetermined point in the document path defined by the location of switch actuator 86, such copy paper feed continuing until the trailing edge of the document passes the switch actuator 86. At this time, the clutch mechanism 83 or other suitable connection between the drive system and the roller pair 82 is disengaged and no further copy paper is withdrawn from the roll.

During the feeding from the roll, the copy paper is advanced between the fixed and movable blades 100 and 102 respectively of a severing mechanism 104, the latter also being under the control of the same or similar mechanism which controls the operation of the feed roller pair 82. In a manner well known in the art, the movable blade 102 is caused to perform a cutting operation to sever the copy paper web substantially at the instant that the trailing edge of a document passes the switch actuator 86, so that the web is severed substantially simultaneously with the termination of web feeding by the roller pair 82. Since the leading edge of the copy paper web was initially positioned at the point of contact of the fixed and movable blades 100 and 102, it will be seen that a length of copy paper is ultimately delivered to the transport system 18 which is substantially identical to the length of the original document being copied.

It should be understood that the distance in the document path between the iluminating station and the predetermined point defined by the switch actuator 86 is equal to the distance in the copy paper path between the imaging station and the point of contact of the blades 100 and 102, so that the leading edge of both a document and the web of copy paper will arrive at their respective illuminating and imaging stations simultaneously.

The present invention is directed toward the combination of a copying machine, generally of the type described above, and a feeding device for automatically successively feeding documents to the copying machine, the feeding device, in its preferred embodiment, being on attachment which is movably mounted on and removed from the copying machine without any adjustments or modifications to either component as manufactured so that the copying machine can be used with or without the feeding device. Also, the feeding device derives its power for feeding documents from the copying machine, and control elements are provided for disengaging the feeding mechanism from the copying machine at such time that it is inappropriate to feed a document.

Referring again to the drawings, the document feeding device, generally indicated by the numeral 110 comprises a substantially flat paper support bed 112 to which is connected a pair of vertically disposed side frame members 114 and 116, the latter being interconnected by a bar 118 to form a rigid structure. Each side frame member 114 and 116 is provided with a downwardly extending projection 120 and 122 respectively which passes through a pair of slots 124 and 126 formed in the horizontal guide plate 20 of the copying machine. Each projection 120 and 122 has a recess 128 and 130 which is adapted to rest upon a bar 132 mounted between a pair of brackets 134 and 136 which are suitably secured to the copying machine side frame members 13 and 15. Each bracket 134 and 136 is provided with an upstanding ear 138 and 140 each of which supports a stud 142 and 144 respectively. The studs 142 and 144 are engaged by hook-shaped portions 146 and 148 formed on the side frame members 114 and 116 respectively so that the entire feeding device 110 rests upon the bar 132 and is secured in place by the studs 142 and 144 against which the hook-shaped portions 146 and 148 are maintained by the tendency of the feeding device 110 to pivot in a counter-clockwise direction, as viewed in FIG. 1, due to the weight of the structure being predominately to the left of the pivot point defined by the bar 132.

It will now be appreciated that the entire structure thus far described is easily mounted on and removed from the copying machine merely by tilting the structure in an appropriate direction to engage or disengage the hook-shaped portions 146 and 148 with the studs 142 and 144, in conjunction with positioning the depressions 128 and 130 on the bar 132 depending on whether the feeding device 110 is being inserted on the copying machine or removed therefrom.

It will be observed that the stud 142 is provided with opposed conical surfaces 150 and 152 for the purpose of laterally centering the feeding device 110 in a desired position on the copying machine.

A pair of paper side guides 154 and 156 are mounted on the paper support 112, the guides being laterally adjustable thereon and secured in a desired position by means of brackets 158 connected to each side guide, the brackets being slidable on a bar 160 supported by depending flanges 162 formed on the bed 112. Each bracket 158 carries a set screw 163 which may be tightened against the bar 160 whereby the side guides 154 and 156 can be adjusted to accommodate documents of various widths.

The feeding device 110 is provided with a combined separating and feeding mechanism by means of which only the top sheet of paper in a stack is fed to the copying machine. A pair of laterally spaced feed rollers 164, formed of rubber or other suitable material having a relatively high degree of friction, are carried by a shaft 166 which is rotatably supported by bushings 168 and 170 mounted in the side frame members 114 and 116 respectively. The feed rollers 164 are connected to the shaft 166 through any suitable type of overriding clutch mechanism 172 through which the shaft 166 is effective to drive the rollers 164 in one direction of rotation but the rollers can be pulled in the same direction independently of the shaft 166. Alternatively, a friction drive connection between the shaft and feed rollers may be utilized.

A plurality of stack arrestors 174 are mounted on a bracket 176 which is pivotably mounted on a shaft 178 secured to the depending flanges 162 of the bed 112. The bed 112 is provided with a plurality of slots 180 disposed between and on opposite sides of the feed rollers 164 through which the stack arrestors are caused to project to an adjustable extent in relation to the feed rollers 164. This adjustment is made by means of an adjustment knob 182 threadedly engaged with a screw 184 the opposite end of which is suitably connected as by a bracket 186 to the under surface of the bed 112, with a spring (not shown) being interposed between the bracket 186 and the bracket 176 to maintain the latter in firm engagement with the adjusting knob 182. It will therefore be seen that rotation of the adjusting knob raises and lowers the stack arrestors 174 relative to the feed rollers 164 so that different thickness of documents to be copied can be properly fed in succession.

The feed rollers, as best seen in FIGS. 2 and 3, are rotated to feed a document to the inlet passageway 26 of the copying machine in the following manner. A sleeve 190 is rotatably mounted on one end of the shaft 166 and a vertically disposed lever 192 is secured to the sleeve 190, the upper end of the lever 192 having a slot 194 formed therein through which one end of a pin 196 projects, the other end of the pin 196 being secured to the side frame member 114. The lever 192, therefore, can pivot about the shaft 166 as a center with the angular limits imposed by the pin 196 engaging opposite ends of the slot 194 for a purpose to be made clear hereinafter.

A gear 198 is fixedly carried by the shaft 166 adjacent the sleeve 190, the gear 198 meshing with a gear 200 rotatably mounted on a stub shaft 202 which is carried by an intermediate portion of the lever 192. The gear 200 meshes with another gear 204 rotatably mounted on another stub shaft 206 which is carried by the lower end of the lever 192. A wheel 208 having a rubber tire 210 or other suitable friction surface is rotatably mounted on the shaft 206 but is connected to the gear 204 to be in driving relationship therewith. Thus as the wheel 208 rotates in a counter-clockwise direction by means hereinafter described, the feed rollers 164 are driven in the same direction through gears 204, 200, 198 and shaft 166 to feed documents from the bed 112.

Referring now to FIG. 3, it will be seen that the lever 192 is normally urged in a counter-clockwise direction about the shaft 166 and can be moved in a clockwise direction within the angular limits of the slot 194, thereby moving all the above-described structure carried by the lever as a unit. Thus, a tension spring 212 has one end 214 connected to the upper end of the lever 192, the other end 216 being connected to a pin 218 mounted on the side frame member 114. A solenoid 220 is mounted on the side frame member 114, the armature 222 of which is connected as at 224 to a lever 226 which is pivotably mounted on the pin 218. An adjustable length link 228 is connected at an intermediate point 230 to the lever 226 and also to the upper end of the lever 192 as at 232.

It will now be seen that when the solenoid is energized by means hereinafter described, the armature 222 is pulled inwardly of the solenoid or toward the right as viewed in FIG. 3, which rocks the lever 226 in a counter-clockwise direction, thereby moving the link 228 to the right and rocking the lever 192 in a clockwise direction. Upon de-energization of the solenoid 220, the foregoing parts return to the positions shown under the influence of the spring 212.

As indicated hereinabove, the document feeding device 110 is readily removable from the copying machine 10, which may be used with or without the feeding attachment, and the latter derives its driving force for feeding documents from the copying machine in a manner which facilitates the attachment or removal of the device 110 without the necessity of any modification to either the feeding device or the copying machine.

Still referring to FIGS. 2 and 3, a gear 234 is fixedly carried by a shaft 236 which is rotatably mounted between the copying machine side frame members 13 and 15, the shaft 236 having a roller 238 mounted thereon which cooperates with another roller 240 carried by a shaft 242 also rotatably mounted between the side frame members 13 and 15. The rollers 238 and 240 constitute the roller pair 28 described above in connection with FIG. 1, the shaft 236 being driven by any suitable means (not shown) and a pair of gears 244 and 246 being provided on the shafts 236 and 242 respectively to drive the roller 240. The gear 234 meshes with another gear 248 rotatably mounted on a stub shaft 250 which is in turn secured to the copying machine side frame member 13. A metal or other hard surfaced driving wheel 252 is either formed integrally with, or otherwise connected to, the gear 248 for rotation with, or otherwise connected, to the gear 248 for rotation therewith, the wheel 252, in the normal position of all the parts, making driving contact with the tire 210 of the wheel 208 carried by the feeding device 110.

Thus it will be apparent from the foregoing that the document feeding device derives its driving power for feeding documents directly from the copying machine, that the mechanical connection between the document feeder and the copying machine is made merely by placing the former on the latter, without the necessity of any adjustments, modifications, tools or complicated manipulations on the part of the operator. Also, it will now be apparent that the copying machine can be used for its intended purpose with or without the document feeding device, with the resultant advantage that single document copying operations can be intermixed with multi-document copying operations by merely inserting or removing the document feeding device. Alternatively, of course, single copy operation may be performed with the feeding device in operative position on the copying machine by merely depositing the original document on the paper support bed 112, after which the document will be fed into the copying machine in the same manner as if it were the last of a stack of documents being copied.

In a presently preferred embodiment, the feeding device 110 is under the control of the copying machine in order to regulate the rate of discharge of documents from the feeding device to be synchronized with the rate at which documents are transported through the copying machine. To accomplish this, the operation of the feed rollers 164 of the document feeding device 110 is placed under the control of a document passing through the copying machine. Preferably this is the same control by means of which the copy paper feed roller pair 82 is actuated through the solenoid actuated clutch mechanism 83.

More particularly, the solenoid 220 is connected to the switch 84 such that the solenoid is energized when the switch actuator 86 is depressed by a document passing through the document path. However, energization of the solenoid 220 has the effect of disconnecting the drive from the wheel 252 to the wheel 208 so that no document feeding takes place while the switch actuator 86 is held depressed by the document. At the same time, however, while the switch actuator is held depressed by a document, copy paper is being fed by the roller pair 82. Therefore, it can be seen that the operation of the feed roller 164 is coordinated with the operation of the copy paper feed roller pair 82 such that when the latter is operating to feed copy paper from the roll 88, the former is not operating, and when the former is operating to feed an original document the latter is not operative to feed copy paper.

A complete cycle of operation of the copying machine with the document feeding device thereon is as follows. Assuming that a stack of documents has been properly placed in the feeding device, and that the latter is in place on the copying machine, when the operator turns on the copying machine main switch, the first and second paper transport means are rendered operable and also the drive wheel 252 begins to rotate. This drives the feed rollers 164 in the manner described to cause the topmost document to be fed into the inlet 26 of the document path in the copying machine.

When the lead edge of the first document depresses the switch actuator 86, the solenoid actuated clutch mechanism 83 is energized to engage the feed roller pair 82 with the main drive system of the copying machine, so that copy paper is now fed to the copy paper transport means 18. It should be noted that the distance between a point in the illuminating station and the switch actuator 86 is the same as the distance between a corresponding point in the imaging station and the cut-off knives 100 and 102, so that the lead edge of both original document and copy paper arrive at their respective stations simultaneously.

When the switch actuator 86 is depressed by the lead edge of an original document, the solenoid 220 is energized with the result that the lever 192 is rocked in a clockwise direction to disengage the driven wheel 208 from the driving wheel 252, thus disconnecting the driving force to the feed rollers 164. However, since the document is already, past the nip of the first roller pair 28 in the document path, the document is now moved by the transport means 14 in the same manner as if the document had been inserted manually. The document pulls the feed rollers 164 through the overriding or friction clutch 172.

When the switch actuator 86 is released by the trailing edge of the document, three events occur substantially simultaneously. The solenoid actuated clutch mechanism 83 disengages the feed roller pair 82 from the drive system of the copying machine to thereby stop the feeding of copy paper. Also, the movable blade 102 of the severing mechanism 104 is caused to perform a cutting movement so that the now severed sheet of copy paper will be substantially the same length as the document which is being copied. Finally, the solenoid 220 is de-energized to cause the lever 192, under the influence of the spring 212, to reengage the driving connection between the wheels 208 and 252 so that the feed rollers 164 commence feeding the next document in the stack to the inlet 26 of the document path, whereupon the cycle repeats itself until the stack of documents is exhausted.

It will therefore be seen that both the copy paper feeding mechanism of the copying machine and the document feeding device are under the control of a document actuated control mechanism in the copying machine so that successive documents and successive portions of the copy paper web are fed to their respective transport means and thence to their respective illuminating and exposing stations in synchronism, and successive documents are fed to the copying machine at a rate regulated in accordance with the rate at which they are transported through the copying machine.

It will now be apparent that there has been provided a copying machine document feeding mechanism which avoids the disadvantages of prior art constructions and which achieves the foregoing objects. It is to be understood that the invention is not to be limited to the specific construction disclosed herein, which is merely illustrative of the best mode presently contemplated for carrying out the invention, the principles thereof being intended to cover all such modifications, variations and equivalents as may be deemed to be within the scope of the appended claims.

I claim:

1. Apparatus for successively copying a plurality of documents comprising in combination:
   (A) a first frame,
   (B) first and second transport means mounted in said frame and defining respectively a document path and a copy paper path,
   (C) an optical system including an illuminating station in said document path and an exposing station in said copy paper path and means for projecting an image from the illuminating station to the exposing station,
   (D) feeding means for feeding a web of copy paper to said second transport means,
   (E) a severing mechanism for severing said web after a predetermined length of copy paper has been fed to said second transport means,
   (F) control means including a switch having a sensing element disposed in the path of movement of a document in said document path for actuating said copy paper feeding means in response to sensing of the leading edge of a document and for deactuating said copy paper feeding means and actuating said severing mechanism to sever the copy paper web in response to sensing the trailing edge of a document,
   (G) a second frame mounted on said first frame and having means for holding a stack of documents,
   (H) feeding means mounted on said second frame operable to successively feed the top most document from said stack to said first transport means,
   (I) cooperating means on said first and second frame for removably mounting said second frame on said frame only in a predetermined position so as to feed documents directly from said stack holding means to said document path,
   (J) a normally operating driving element carried by said first frame,
   (K) means carried by said second frame for normally establishing a driving connection between said driving element and said document feeding means when said second frame is placed on said first frame in said predetermined position, and said means including means under the control of said switch means for disabling operation of said document feeding means in response to said leading edge sensing of a document and for enabling operation of said document feeding means in response to said trailing edge sensing of a document.

2. Apparatus as set forth in claim 1 wherein said last named means includes a lever movably mounted on said second frame, a driven element mounted on said lever, spring means normally urging said lever to a position where said driven element engages said driving element, and solenoid actuated means controlled by said switch means for moving said lever against the force of said spring means to a position where said driven element is disengaged from driving element.

References Cited

UNITED STATES PATENTS 3,181,420   5/1965   Rautbord et al. ____ 355—13 X
3,289,532   12/1966   Baumgarten et al. ____ 355—28

NORTON ANSHER, Primary Examiner

RICHARD A. WINTERCORN, Assistant Examiner

U.S. Cl. X.R.

355—13, 28